United States Patent [19]

Ourdouillie

[11] 3,905,278

[45] Sept. 16, 1975

[54] MANUFACTURERS OF JACKS OPERATED BY HIGH PRESSURE FLUID

[75] Inventor: André P. Ourdouillie, Senlis, France

[73] Assignee: Poclain, Oise, France

[22] Filed: Feb. 26, 1974

[21] Appl. No.: 445,867

[30] Foreign Application Priority Data

Mar. 8, 1973 France .................. 73.8387

[52] U.S. Cl. .................... 92/10; 92/80; 92/82; 92/83; 92/85; 92/112; 92/183
[51] Int. Cl.² .......................................... F15B 15/22
[58] Field of Search ............ 92/8, 9, 10, 11, 12, 80, 92/82, 83, 85, 86.5, 112, 113, 181 R, 181 P, 182, 183

[56] References Cited
UNITED STATES PATENTS

| | | | |
|---|---|---|---|
| 2,323,731 | 7/1943 | Shetzline ........................ | 92/181 R |
| 2,627,233 | 2/1953 | McConnohie .................... | 92/182 X |
| 2,915,043 | 12/1959 | Neiner ............................. | 92/12 X |
| 2,985,140 | 5/1961 | Fagge .............................. | 92/113 X |
| 3,063,423 | 11/1962 | Riordan .......................... | 92/112 X |
| 3,199,414 | 8/1965 | Gray ............................... | 91/372 |
| 3,293,994 | 12/1966 | Napolitano ...................... | 92/82 X |
| 3,382,772 | 5/1968 | Kampert et al. ................. | 92/85 X |
| 3,426,655 | 2/1969 | Rumsey ........................... | 92/183 |
| 3,768,932 | 10/1973 | Svercl et al. .................... | 92/183 X |
| 3,834,282 | 9/1974 | Kongelbeck ..................... | 92/10 |

*Primary Examiner*—Martin P. Schwadron
*Assistant Examiner*—Abraham Hershkovitz
*Attorney, Agent, or Firm*—Mason, Fenwick & Lawrence

[57] ABSTRACT

A jack having a cylinder, a piston in the cylinder and a piston rod attached to the piston, the periphery of the piston including a recess defined by two shoulders facing one another, a pair of rings surrounding the piston in the recessed part thereof, biased axially apart and limited in their axial separation by the shoulders, a duct connecting the space between the rings to a source of fluid through the piston rod, the duct including a non-return valve whereby fluid may be fed to the space between the rings.

10 Claims, 3 Drawing Figures

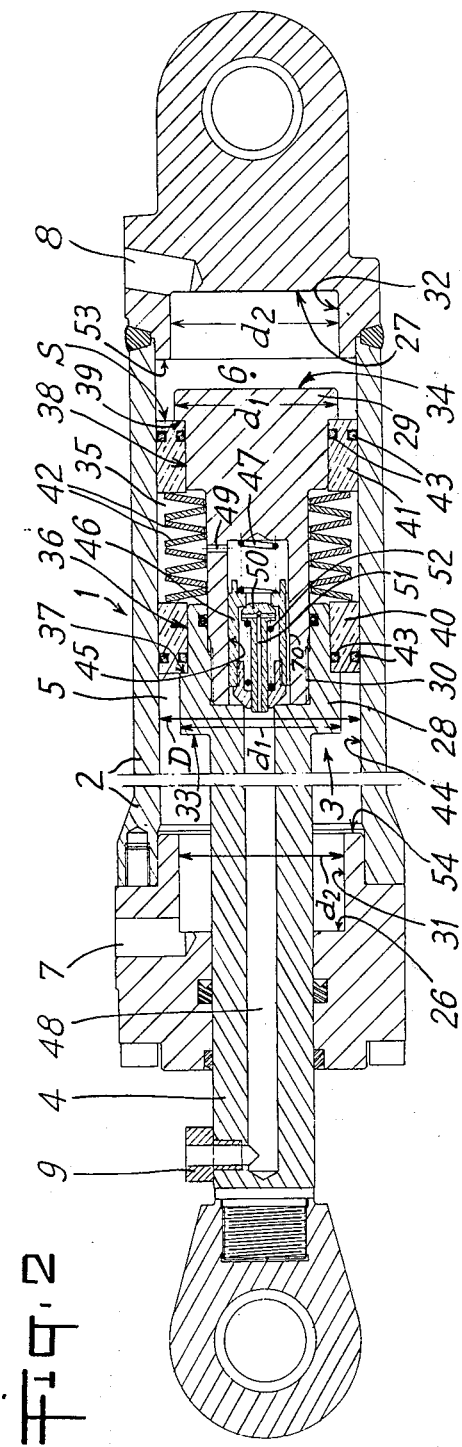
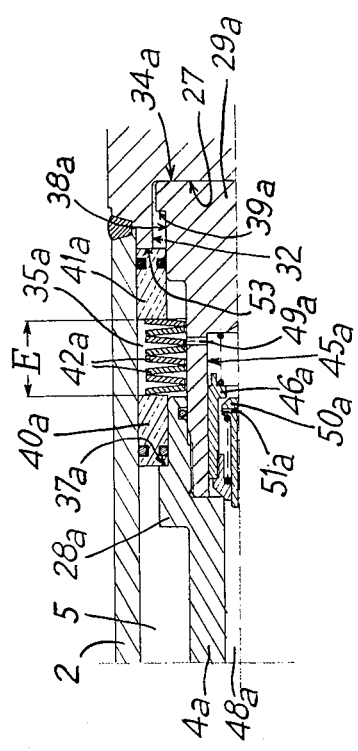

MANUFACTURERS OF JACKS OPERATED BY HIGH PRESSURE FLUID

Manufacturers of jacks operated by high pressure fluid know very well that seals interposed between the piston and the cylinder have an unfortunate tendency to deform under the effects of the high pressure which at any given instant obtains in only one working chamber of the jack. An extrusion phenomenon is produced and ends by causing premature deterioration of the seal in question.

The invention proposes inter alia to correct this disadvantage of previously known jacks.

For this purpose its object is a jack consisting of:
a cylinder,
a piston which is mounted slidingly in this cylinder,
a piston rod which is integral with the said piston,
two main chambers which are arranged on opposite sides of the said piston and are bounded by the piston and the cylinder,
a recess which is arranged in the cylindrical periphery of the piston and which is bounded by two shoulders on this piston, orientated towards one another, and by a cylindrical face of diameter less than that of the said shoulders,
at least two cylindrical rings which are mounted slidingly in the said recess and which bound in cooperation with the piston and the cylinder an intermediate chamber, whilst the sealing is produced between the said rings and on the one hand the inner face of the cylinder and on the other hand the cylindrical face of the recess,
and at least one return member in a position separated from the two rings of each pair of consecutive rings, which is arranged between the two said rings.

In this jack the return member is coupled solely with the piston and consists of a spring independent of the cylinder, whilst a stuffing duct arranged in the piston rod and the piston connects the intermediate chamber to a source of stuffing fluid, and a stuffing valve is arranged in this stuffing duct and only allows the flow of fluid from the source of stuffing fluid towards the intermediate chamber.

Advantageously this jack likewise includes:
a relief duct arranged in the piston rod and the piston, which connects the intermediate chamber to a relief tank,
and a calibrated relief valve which is arranged in the said relief duct and which allows the flow of fluid from the said intermediate chamber towards the relief tank.

Preferably the relief duct is constituted by the stuffing duct itself.

Similarly the relief valve is often arranged in the movable blocking element of the stuffing valve.

It is likewise preferred to constitute the return member by a spring the initial tension of which is equal to a portion of the compressive force equal to the product of the maximum difference between the pressures of the fluids contained in the two main chambers and the surface of the section of the ring in contact with the fluid in that one of the two said main chambers in which the pressure is the greater.

In this case the initial tension of the spring is advantageously substantially equal to half the said compressive force, the spring consisting, for example, of a plurality of stacked resilient washers.

Generally the rings are identical.

Finally, the maximum diameter of the piston may be substantially less than the diameter of the cylinder. In this case the cylinder has at each end a cylindrical portion of diameter smaller than its centre portion, into which the piston is capable of penetrating and which is bounded by an axial shoulder in the cylinder. In that case at the end of each of its maximum sliding strokes the piston bears against the end of the cylinder so that the separation between the ring which has come to bear against the said axial shoulder, and the other ring remains at least equal to a given minimum value which is a function of the limit of deterioration by crushing of the return member.

The invention will be better understood and its secondary characteristics as well as their advantages will become apparent in the course of the description of an embodiment given below by way of example.

It is to be understood that the description and the drawings are given only by way of indication and non-restrictively.

Reference will be made to the attached drawings in which:

FIG. 2 is a section of the jack shown in FIG. 1, in a first relative position of the parts; and FIG. 3 is a section of a detail of the jack of FIG. 2, with the parts in a second relative position.

Figure 1:
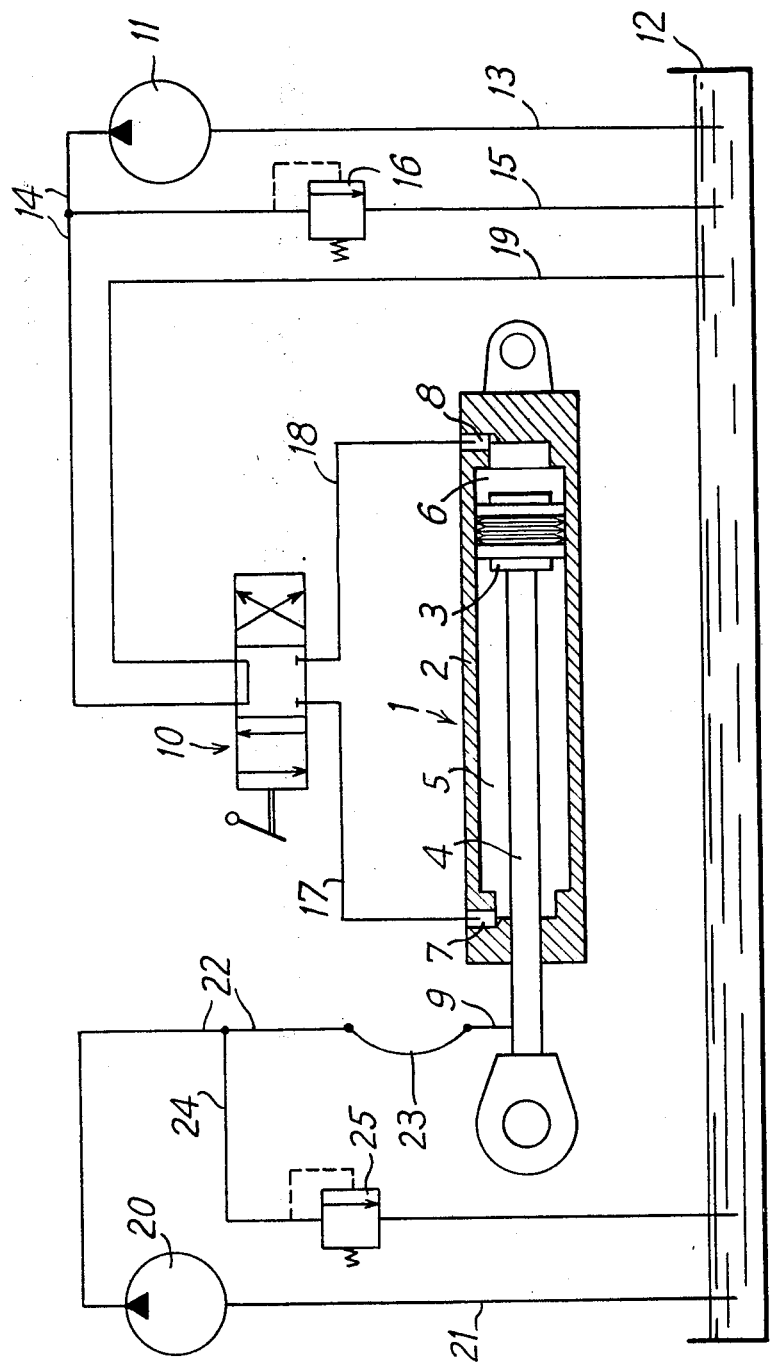
FIG. 1 is a diagram of the feed circuit of an embodiment of jack in accordance with the invention.

Referring to FIG. 1, a jack 1 is illustrated and comprises a cylinder 2 inside which a piston 3 is mounted slidingly. A piston rod 4 is fast with the piston 3, the latter bounding inside the cylinder two working chambers 5 and 6 in communication with the outside of the jack respectively through apertures 7 and 8 arranged in the wall of the cylinder 2. It is likewise to be observed that a connector 9 for a fluid pipe is attached to the piston rod 4 and communicates as will be seen from FIG. 2 with a duct arranged in the said piston rod 4.

A three-position regulator 10 and a pump 11 for feeding high pressure fluid to one or other of the chambers 5 and 6 are likewise illustrated. The pump 11 is connected to a fluid tank 12 by its suction pipe 13 and to the regulator 10 by its delivery pipe 14. A pipe 15 tapped off from the pipe 14 connects this pipe 14 to the tank 12, a calibrated relief valve 16 being arranged in the pipe 15. In addition, the regulator 10 is connected to the chambers 5 and 6 by pipes 17 and 18 respectively, and to the tank 12 by a pipe 19.

The three positions of the regulator 10 correspond:

the first position, with putting in communication the pipes 14 and 18, and 17 and 19;

the second position, with putting in communication the pipes 14 and 19 and blocking at the level of the regulator 10, of the pipes 17 and 18;

and the third position, with putting in communication the pipes 14 and 17, and 18 and 19.

It is likewise to be observed that a stuffing pump 20 is connected to the tank 12 by its suction pipe 21 and to the connector 9 on the piston rod 4 by its delivery pipe 22 and a flexible pipe 23. A pipe 24 tapped off from the pipe 22 connects the latter to the tank 12, a calibrated relief valve 25 being arranged in this pipe 24.

By way of indication, the calibration pressures of the calibrated valves 16 and 25 are of the order respectively of 400 bars and 15 bars.

Referring to FIG. 2, there has been illustrated the detail of the jack 1 in a first position of the piston 3 inside the cylinder 2, this position being intermediate between the two extreme ends 26 and 27 of the said cylinder.

The piston 3 is produced in two portions 28 and 29 which are assembled by screwing together at 30 and which have a diameter $d_1$ smaller than the diameter D of the central portion of the cylinder 2. The ends of the cylinder 2 moreover comprise cylindrical portions 31 and 32 of diameter $d_2$ slightly larger than the diameter $d_1$ so as to enable introduction of the portions 28 and 29 of the piston 3 respectively within the said cylindrical portions until if necessary the end faces 33 and 34 of the portions 28 and 29 bear against the ends 26 and 27 of the cylinder 2.

A recess is arranged in the piston 3 and consists of a first reduced diameter cylindrical surface 36 of diameter smaller than the diameter $d_1$, bounded by a shoulder 37 on the portion 28 of the piston in which this surface 36 is machined, and of a second reduced diameter cylindrical surface 38 of diameter equal to the surface 36, bounded by a shoulder 39 on the portion 29 of the piston in which this surface 38 is machined. The shoulders 37 and 39 in addition include mutually facing surfaces.

First and second cylindrical rings 40 and 41 are mounted slidingly on the cylindrical surfaces 36 and 38 respectively and have an inner diameter substantially equal, except for assembly clearance, to that of the said surfaces and an outer diameter substantially equal, likewise except for assembly clearance, to the diameter D of the central portion of the cylinder. Finally a stack of resilient washers 42 is interposed between the rings 40 and 41 and tends to keep the two said rings separated. It is to be observed that seals 43 are interposed between each ring 40 or 41 and on the one hand the inner face 44 of the cylinder 2 and on the other hand the cylindrical surfaces 36 and 38.

It is to be observed that a cylindrical cavity 45 has been arranged in the portion 29 of the piston, inside which a blocking element 46 of a stuffing valve is introduced and mounted slidingly, a spring 47 interposed between the said blocking element 46 and the bottom of the cavity 45 tending to keep this element 46 in the position blocking a stuffing duct 48 connected to the connector 9. In addition the cavity 45 communicates permanently with the intermediate chamber 35 constituted by the volume contained between the rings 40 and 41, the piston 3 and the cylinder 2, by means of an aperture 49 which opens into the said chamber. The blocking element 46 in its blocking position bears against the portion 28 of the piston. In the open position it allows the flow of fluid from the connector 9 towards the chamber 35 by means of stuffing duct 48 and a slot 70 extending along the length of blocking element 46 and then through aperture 49.

Finally it is to be observed that the movable element 50 of a second valve is mounted slidingly inside the blocking element 46 itself. An internal duct 51 communicates with the stuffing duct 48 whilst a spring 52 interposed between this movable element 50 and the blocking element 46 tends to return the movable element 50 into its position in which it isolates the chamber 35 from the duct 48. The movable element 50 in association with the blocking element 46 and the spring 52 constitutes therefore a calibrated relief valve which only allows the flow of fluid from the chamber 35 towards the duct 48 under certain conditions discussed hereinafter.

By way of indication, the calibration pressures corresponding with the initial tensions of the springs 47 and 52 are of the order of 15 bars and even lower than 15 bars as far as the stuffing valve is concerned which consists of the blocking element 46, the spring 47 and the portion 28 of the piston, and 200 to 300 bars, for example, as far as the calibrated relief valve is concerned, with the spring 52.

In the position as FIG. 1 the rings 40 and 41 are bearing against the shoulders 37 and 39 respectively, so that the washers 42 are in their assembly configuration in which they are most relaxed.

On the other hand, referring to FIG. 3, the piston and the various parts which are coupled to it have come into positions referenced by the same references followed by the index $a$, inside the cylinder 2. Thus the portions of the piston are at 28$a$ and 29$a$, the end of the portion 29$a$ being introduced into the cylindrical end portion 32 of the cylinder, and the end face 34$a$ of this portion 29$a$ of the piston bearing against the end 27 of this cylinder. The ring 41$a$ has come to bear against the shoulder 53 which bounds the cylindrical portion 32 of the cylinder 2; similarly, moreover, a shoulder 54 bounds the other cylindrical end portion 31 of the cylinder. The ring 41$a$ after having been stopped by the shoulder 53 has not been able to pursue with the piston the sliding stroke of the latter. It has been separated from the shoulder 39$a$ on the portion 29$a$ of the piston and has approached, sliding on the section 38$a$, the ring 40$a$ which itself has remained bearing against the shoulder 37$a$ on the portion 28$a$ of the piston. The separation of the inner faces of the rings 40$a$ and 41$a$ has become E. With the face 34$a$ of the piston bearing against the face 27 of the cylinder, E is the smallest value which the separation between the two rings can assume during sliding of the piston towards the face 27 of the cylinder. This separation therefore corresponds with maximum compression of the resilient washers 42$a$.

It has still to be indicated that the piston rod has arrived at 4$a$, the stuffing duct in turn having arrived at 48$a$. The blocking element of the stuffing valve is at 46$a$ in the cylindrical cavity 45$a$, in the position blocking the duct 48$a$. On the other hand it is to be observed that the movable element of the relief valve at 50$a$ is in its position opening the duct 48$a$, so that the intermediate chamber 35$a$ is in communication with the duct 48$a$ by means of the aperture 49$a$ and the duct 51$a$. Finally it will be observed that it remains within the scope of the invention to employ more than two rings 40 and 41. Moreover the stuffing valve (46-47-48) may consist in fact of a simple non-return valve.

With the explanation of the functioning of the jack, which will now be given, the advantages which result from its adoption will be better understood.

Referring to FIG. 1, it is to be observed first of all that putting the regulator 10 in one of its first or third positions enables fluid under pressure delivered by the pump 11 to be fed through the pipe 14 and the pipes 18 or 17 respectively to one of the chambers 6 or 5. Correlatively the other chamber 5 or 6 is put in communication with the tank 12 by means respectively of the pipes 17 or 18 and the pipe 19. Moreover the pump 20 delivers the fluid at low pressure into the pipes 22 and 23 and through the connector 9 into the duct 48. The excess of fluid returns to the tank 12 through the check valve 25.

To begin with, therefore, the regulator 10 will be assumed arranged in its first position. The maximum value P of the high pressure of the feed fluid obtains in the chamber 6, whereas the chamber 5 being put in communication with the tank 12 the pressure of the fluid in this chamber 5 is practically zero. It will have been observed in addition that the stuffing fluid has arrived through the pipe 48 in front of the blocking element 46 which it has raised, and has entirely filled the chamber 35 from which it can no longer escape but by raising the relief valve 50. Taking into account the calibration pressure obtained by the spring 52 the valve 50 remains closed at least during a first phase.

One notes therefore that a certain volume of fluid is trapped in the chamber 35 between the two rings 40 and 41. The ring 41 takes up a position of equilibrium under the opposing effects:

of the force from the pressure P, equal to the product $P \times S$, of P and the section S of this ring;

and of two other forces equal on the one hand to the force of resilient return R of the washers 42 and on the other hand to the force from the pressure p of the fluid contained in the chamber 35, equal to $p \times S$.

One obtains during equilibrium of the ring 41:

$$p \times S + R = PXS$$

Hence:

$$p = P - R/S$$

R, which in the case of a liquid fluid and taking into account the incompressibility of liquids is practically equal to the initial tension of the resilient washers 42, can very easily be chosen so that $p = P/2$, which is the preferred value for $p$.

When in fact $p = P/2$ the presence is noted of a stepping of the pressures which are in the chambers 6, 35 and 5 equal respectively to P, P/2 and 0. The seals 43 on each ring are therefore only subjected to differences in pressure:

$P - P/2 = P/2$ for the seals on the ring 41, $P/2 - 0 = P/2$ for the joints on the ring 40.

Their conditions of operation being much less rigorous than those of the seals of a conventional jack, the sealing which they ensure is more easily produced. At maximum equal pressures P the endurance in service of the jack which has been described is superior to that of jacks previously known; or else at equal endurance the maximum pressure P admissible in the jack described above is significantly higher than (theoretically twice) the maximum pressure allowed in the conventional jacks.

Of course, as has been indicated previously, it is possible to provide a number of rings (more than two rings), which obviously would enable a stepping of pressures to be produced between the inlet chamber and the delivery chamber of the jack more progressive than that which has been given above.

Finally the configuration will be examined which is obtained (FIG. 3) when, the regulator 10 having been put in its third position, the inlet chamber for the high pressure fluid is the chamber 5 and in addition the piston has arrived at the end of its maximum sliding stroke. In approaching the ring 40a the ring 41a has compressed the fluid contained in the chamber 35a until the pressure in the said chamber 35a reaches the value of the calibration pressure of the relief valve 50a and hence the said valve opens. The fluid from the chamber 35a then returns to the tank 12 through the relief valve 50a, the ducts 48a, 23 and 24, and the check valve 25. It is to be observed that the duct 48a then does duty as relief duct. A throttling of the fluid occurs at the level of the valve 50a so that between the instant at which the ring 41a comes to bear against the shoulder 53 while being in contact with the shoulder 39a, and that at which it is entirely separated from the said shoulder 39a, being separated from the ring 40a by the value E, a slowing down of the motion of the piston is produced. An end-of-stroke damper for the piston has therefore been produced, over and above the improvement relative to the production of good sealing at the level of the seals 43.

It may likewise be observed that the value E of minimum separation between the rings 40a and 41a is a function of the length of the cylindrical section 32 of the cylinder 2 and of the distance separating the face 34a of the portion 29a of the piston from the shoulder 39a of the said piston. This value E is in this case chosen so that the maximum compressive force of the resilient washers 42 which results from it is less than the force which would result in permanent deformation or damage of the washers.

It is to be noted again that the functioning studied is produced of course in the same way when the piston arrives at the end of its other maximum stroke, near the end 26. In fact the arrangement of the rings 40 and 41 is symmetrical with respect to the intermediate chamber 35. In addition, in the example chosen, the rings 40 and 41 are identical. It is likewise to be understood that the fluids employed may be gases and not liquids as in the example illustrated. Perhaps in that case the determination of the value R of the return force of the washers 42 will be slightly more tricky to calculate, because the fluid contained in the chamber 35 will be compressible. The functioning studied will nevertheless be entirely preserved.

The invention is not limited to the embodiment which has been described but on the contrary covers the variants upon it which might be applied to it without departing from its scope or its spirit.

What is claimed is:

1. A jack comprising:
    a cylinder;
    a piston mounted for axial reciprocation in said cylinder;
    a piston rod fixedly connected to said piston on a first end and having a second opposite end external of said cylinder so that the space within the cylinder is divided into two main chambers respectively positioned on opposite sides of said piston and bounded by the piston and the cylinder walls;
    said piston including first and second shoulders having mutually facing surfaces;
    reduced diameter cylindrical surface means between said mutually facing surfaces;
    said reduced diameter cylindrical surface means having a diameter less than the outer diameter of said shoulders;
    an annular intermediate chamber extending about said piston between the facing surfaces of said shoulders;
    a first cylindrical ring matingly mounted on said reduced diameter cylindrical surface adjacent said first shoulder;

a second cylindrical ring matingly mounted on said reduced diameter cylindrical surface adjacent said second shoulder;

external sealing means provided on the outer surface of each of said cylindrical rings and engageable with the inner face of said cylinder;

internal sealing means between each of said cylindrical rings and said reduced diameter cylindrical surface means of said piston;

biassing means for urging said first and second cylindrical rings axially away from each other respectively toward said first and second shoulders;

a source of pressurized fluid; and stuffing conduit means extending internally along the length of said piston rod and having one end communicating with said annular intermediate chamber and having an opposite end connected to said source of pressurized fluid.

2. The invention of claim 1 additionally including:

valving means mounted in said stuffing conduit for permitting the flow of fluid from said conduit into said annular intermediate chamber when the pressure in said annular intermediate chamber is below a predetermined value.

3. The invention of claim 2 wherein said source of pressurized fluid includes:

a hydraulic pump;

a delivery pipe extending from said hydraulic pump and connected to said stuffing conduit; and further including:

a calibrated pressure relief valve mounted in said delivery pipe for preventing pressure in said delivery pipe from exceeding a predetermined value.

4. The invention of claim 3 wherein said valve means mounted in said stuffing conduit comprises:

a movable blocking element;

spring means normally engaged between a portion of said piston and said movable blocking element in blocking position between said stuffing conduit and said annular intermediate chamber; and further including:

excess chamber pressure relief valve means mounted in said blocking element for releasing excess pressure in said annular intermediate chamber into said stuffing conduit when the pressure in said annular intermediate chamber exceeds that in the stuffing conduit by a predetermined amount.

5. The invention of claim 4 additionally including:

means defining a radial abutment extending inwardly adjacent each end of said cylinder and further defining a reduced diameter cylindrical opening defining each extreme end of said cylinder, said reduced diameter cylindrical opening at each end of said cylinder being of sufficiently large diameter to matingly receive the extreme ends of said piston at the end of the stroke with the ring on the piston facing the radial abutment engaging the radial abutment and being prevented from moving with the piston during the terminal portion of the stroke so as to compress the biassing means urging the rings away from each other and reduce the volume of said annular intermediate chamber at the end of the stroke and increase pressure in the intermediate chamber which can be vented by the chamber excess pressure relief valve in the blocking means to provide a cushioning effect at each end of the piston stroke.

6. The invention of claim 5 wherein said blocking element comprises a hollow movable sleeve member having an axial passageway extending along its length; and said chamber excess pressure relief valve comprises a valve member mounted in said axial passageway in said hollow movable sleeve member; and including biassing means biassing said excess chamber pressure relief valve member into a position normally closing said axial passageway in said sleeve member but permitting movement of said excess chamber pressure relief valve member to an open position by excessive pressure from said intermediate chamber so that said axial passageway provides communication between said stuffing conduit and said annular intermediate chamber to vent said intermediate chamber.

7. The invention of claim 6 wherein said piston is formed of first and second piston components threaded together and each respectivley including said first and second shoulders.

8. The invention of claim 1 wherein said biassing means for urging said first and second cylindrical rings axially away from each other respectively toward said first and second shoulders comprises a plurality of resilient washer members interposed between said rings.

9. The invention of claim 8 additionally including:

one-way valving means mounted in said stuffing conduit for permitting the flow of fluid from said stuffing conduit into said annular intermediate chamber when the pressure in said annular intermediate chamber is below a predetermined value; and chamber pressure relief valve means for permitting flow from said intermediate chamber into said stuffing conduit when the pressure in said intermediate chamber exceeds the pressure in said stuffing conduit by a predetermined value.

10. The invention of claim 9 wherein said source of pressurized fluid includes:

a hydraulic pump;

a delivery pipe extending from said hydraulic pump and connected to said stuffing conduit; and further including:

a calibrated pressure relief valve mounted in said delivery pipe for preventing pressure in said delivery pipe from exceeding a predetermined value.

* * * * *